US012249230B2

(12) United States Patent
Ayub

(10) Patent No.: US 12,249,230 B2
(45) Date of Patent: Mar. 11, 2025

(54) SMART VEHICLE LOCATOR SYSTEM

(71) Applicant: Roger Ayub, Jericho, NY (US)

(72) Inventor: Roger Ayub, Jericho, NY (US)

( * ) Notice: Subject to any disclaimer, the term of this patent is extended or adjusted under 35 U.S.C. 154(b) by 138 days.

(21) Appl. No.: 18/136,459

(22) Filed: Apr. 19, 2023

(65) Prior Publication Data

US 2024/0355190 A1 Oct. 24, 2024

(51) Int. Cl.
*H01Q 1/12* (2006.01)
*G08B 21/24* (2006.01)
*H01Q 1/08* (2006.01)
*H01Q 1/32* (2006.01)

(52) U.S. Cl.
CPC ............. *G08B 21/24* (2013.01); *H01Q 1/084* (2013.01); *H01Q 1/3275* (2013.01)

(58) Field of Classification Search
None
See application file for complete search history.

(56) References Cited

U.S. PATENT DOCUMENTS 7,119,679 B1 * 10/2006 Crom ..................... B60Q 1/482 340/426.22
10,635,107 B2 * 4/2020 Matsuyama ........... G03B 29/00
2009/0262033 A1 * 10/2009 King ........................ H01Q 3/08 343/882
2023/0370158 A1 * 11/2023 Tran ........................ H02S 10/40

* cited by examiner

*Primary Examiner* — John F Mortell
(74) *Attorney, Agent, or Firm* — Fishman Stewart PLLC

(57) ABSTRACT

A smart vehicle locator system including a base housing unit, a motor, an illumination device, an antenna device, a controller, and a remote control device. The base housing unit is configured to attach to a vehicle. The motor is contained in the base housing unit and the motor is configured to actuate motion of a motorized antenna. The illumination device includes a plurality of lights and is attached to a proximate end of the motorized antenna. The motorized antenna is housed in the removable housing unit in a default state and is controlled by the controller, wherein the motorized antenna is deployed and erected vertically from the base housing unit when activated by the controller and wherein the motorized antenna collapses into the base housing structure when deactivated by the controller and when in a default state. The remote control device includes at least one control key and at least one status indicator. The controller transmits and receives signals to and from the remote control device. The controller activates the motorized antenna to deploy so long as no objects are detected within the vertical range of motion of the motorized antenna if the motorized antenna is erected.

15 Claims, 7 Drawing Sheets

SMART VEHICLE LOCATOR SYSTEM

FIELD OF THE INVENTION

Embodiments described herein generally relate to locator systems, and more particularly to a smart vehicle locator system.

BACKGROUND OF THE INVENTION

Sometimes individuals return to a parking lot and are not able to remember where their car is parked. It can become a very time consuming and stressful ordeal trying to find one's parked car when they cannot remember where the car is parked. Hence, a mechanism for locating a vehicle is desirable.

BRIEF DESCRIPTION OF THE DRAWINGS

The various advantages of the embodiments of the present disclosure will become apparent to one skilled in the art by reading the following specification and appended claims, and by referencing the following drawings, in which:

SUMMARY OF THE INVENTION

Figure 1:
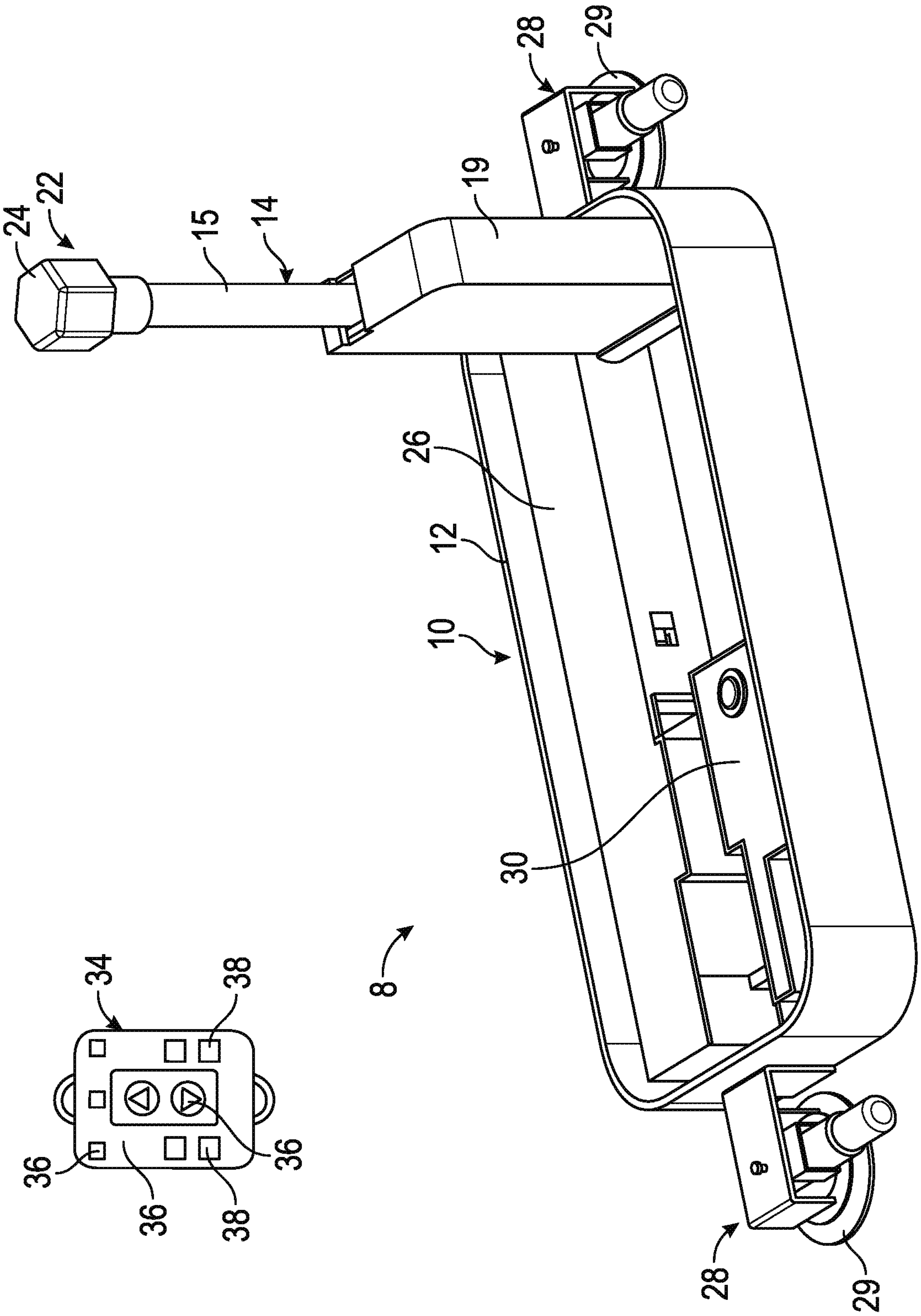
FIG. 1 shows an exemplary view of a smart vehicle locator system according to an embodiment of the present disclosure.
Figure 2A:
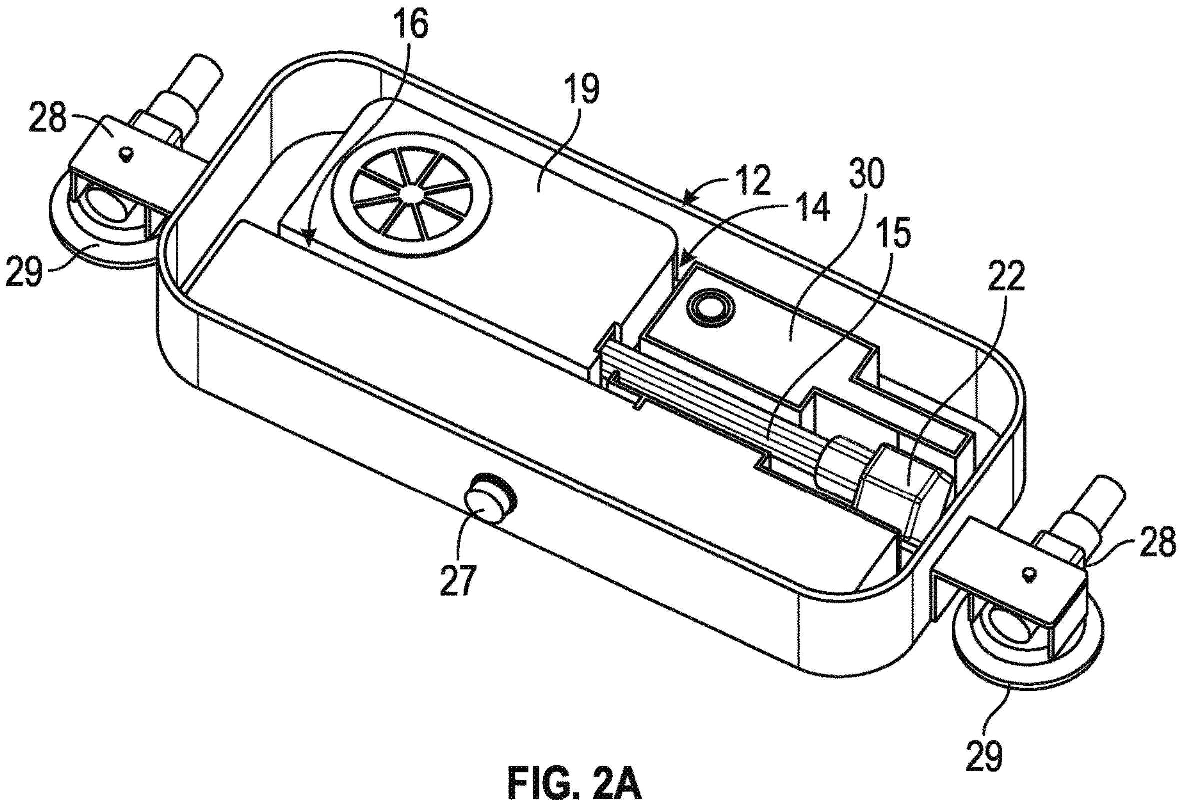
FIG. 2A shows an exemplary top plan view of the base housing unit of the smart vehicle locator system according to an embodiment of the present disclosure.
Figure 2B:
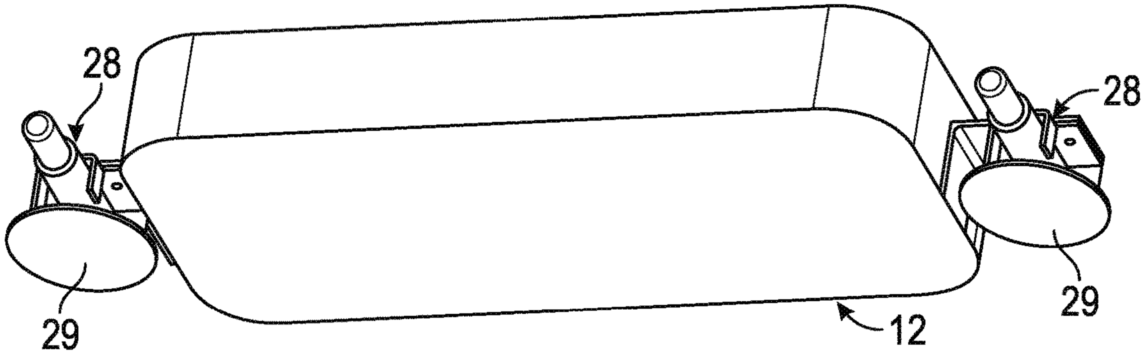
FIG. 2B shows an exemplary bottom plan view of the base housing unit of the smart vehicle locator system according to an embodiment of the present disclosure.
Figure 3A:
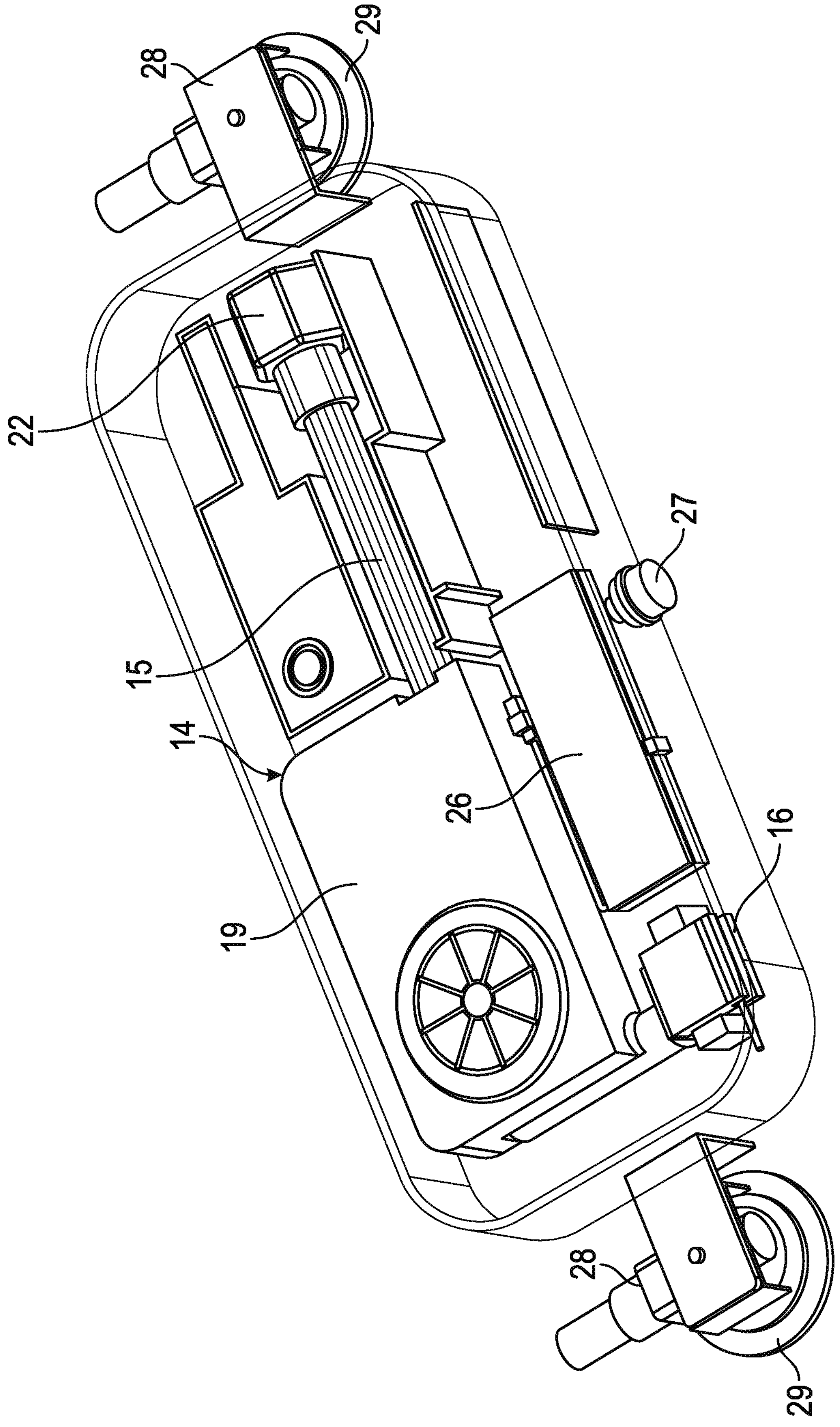
FIG. 3A shows another exemplary top plan view of the base housing unit of the smart vehicle locator system according to an embodiment of the present disclosure.
Figure 3B:
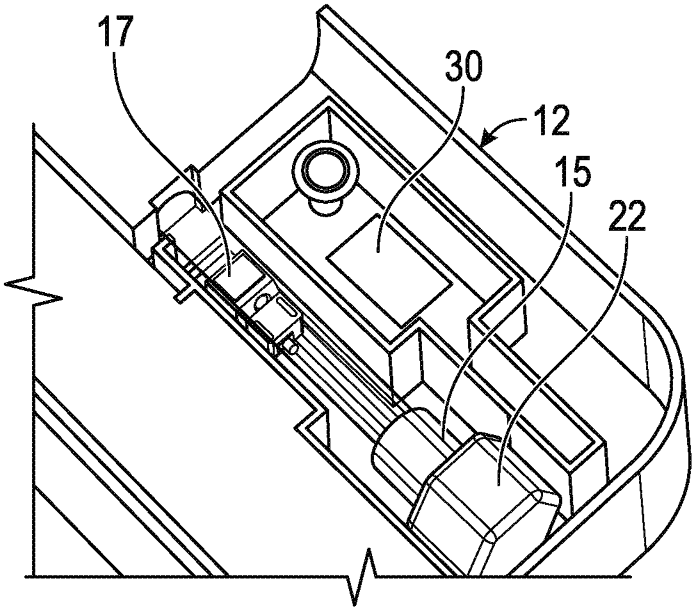
FIG. 3B shows an exemplary top plan sectional view of an interior section of the base housing unit of the smart vehicle locator system according to an embodiment of the present disclosure.

Exemplary embodiments disclosed herein describe a smart vehicle locator system. The system includes a base housing unit, a motor, an illumination device, an antenna device, a controller and a remote control device. The base housing unit is configured to attach to a vehicle. The motor is contained in the base housing unit and the motor is configured to actuate motion of a motorized antenna. The illumination device includes a plurality of lights and is attached to a proximate end of the motorized antenna. The motorized antenna is housed in the removable housing unit in a default state and is controlled by the controller, wherein the motorized antenna is deployed and erected vertically from the base housing unit when activated by the controller and wherein the motorized antenna collapses into the base housing structure when deactivated by the controller and when in a default state. The remote control device includes at least one control key and at least one status indicator. The controller transmits and receives signals to and from the remote control device. The controller activates the motorized antenna to deploy so long as no objects are detected within the vertical range of motion of the motorized antenna if the motorized antenna is erected.

In some exemplary embodiments, the system comprises a sensor for detecting obstacles in the vertical range of motion of the antenna.

In some exemplary embodiments, the system further comprises a proximity sensor.

In some exemplary embodiments, the controller uses the sensor and the proximity sensor to detect whether an object is located within the vertical range of motion of the motorized antenna.

In some exemplary embodiments, the distal end of the motorized antenna is fixed inside of the antenna cover.

In some exemplary embodiments, the illumination device rotates horizontally with respect to the motorized antenna when the motorized antenna is erected.

In some exemplary embodiments, the system further comprises a sound emitter.

In some exemplary embodiments, the controller activates the sound emitter when at least one object is detected within the vertical range of motion of the motorized antenna.

In some exemplary embodiments, the controller sends a notification to the remote control device when at least one object is detected within the vertical range of motion of the motorized antenna.

In some exemplary embodiments, the at least one status indicator is an antenna obstructed indicator.

In some exemplary embodiments, the at least one control key is an deploy antenna key.

In some exemplary embodiments, the at least one control key is a light strobing trigger.

In some exemplary embodiments, the at least one control key is a light motion trigger.

In some exemplary embodiments, the system further comprises an attachment structure for attaching the base housing unit to a vehicle.

DETAILED DESCRIPTION

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents.

The present disclosure relates to a smart vehicle locator system ("system"). As illustrated in FIGS. 1-7, an exemplary system 8 comprises a vehicle attachment device 10 and a remote control device 34. The vehicle attachment device 10 comprises a base housing unit 12, an antenna device 14, an illumination device 20, a power device 26, an attachment structure 28 and a controller 30. The base housing unit 12 encloses the antenna device, illumination device, the power device, and the controller. The base housing unit may be configured out of a sturdy, water-resistant material, such as, plastic. The base housing unit 12 is configured to removably attach to an object via attachment structure 28.

The attachment structure 28 may include a pair of attachment units 29, each attached to an opposite end of the base housing unit 12, such as, for example, a pair of suction cups. The attachment structure is configured to removably attach the base housing unit 12 to an external object. The attachment units are each attached to opposite ends of the base housing unit at one of its ends and is configured to attached to an external object, such as, for example, a vehicle, at its other end. A vehicle may include an automobile, a boat, a motorcycle, etc. The base housing unit 12 may attach to any external surface of the vehicle (e.g., roof, trunk, window, etc.). More specifically, the base housing unit may attach to the vehicle at any surface amenable to create a friction connection with the pair of attachment units.

The antenna device 14 comprises an antenna 15, a motor 16, a proximity sensor 17, a sensor 18, an antenna housing unit 19, and a light receiving surface 20. The antenna is a power (i.e., motorized) antenna and operates with a small motor 16 which is housed directly beneath the antenna 15 in the antenna housing unit 19. The motor may be a cylindrical motor that spins and becomes energized upon receipt of an activation signal from the controller 30. The motor propels the antenna out of the base housing unit 12 when activated and collapses the antenna upon receipt of a deactivation signal from the controller.

Figure 5:
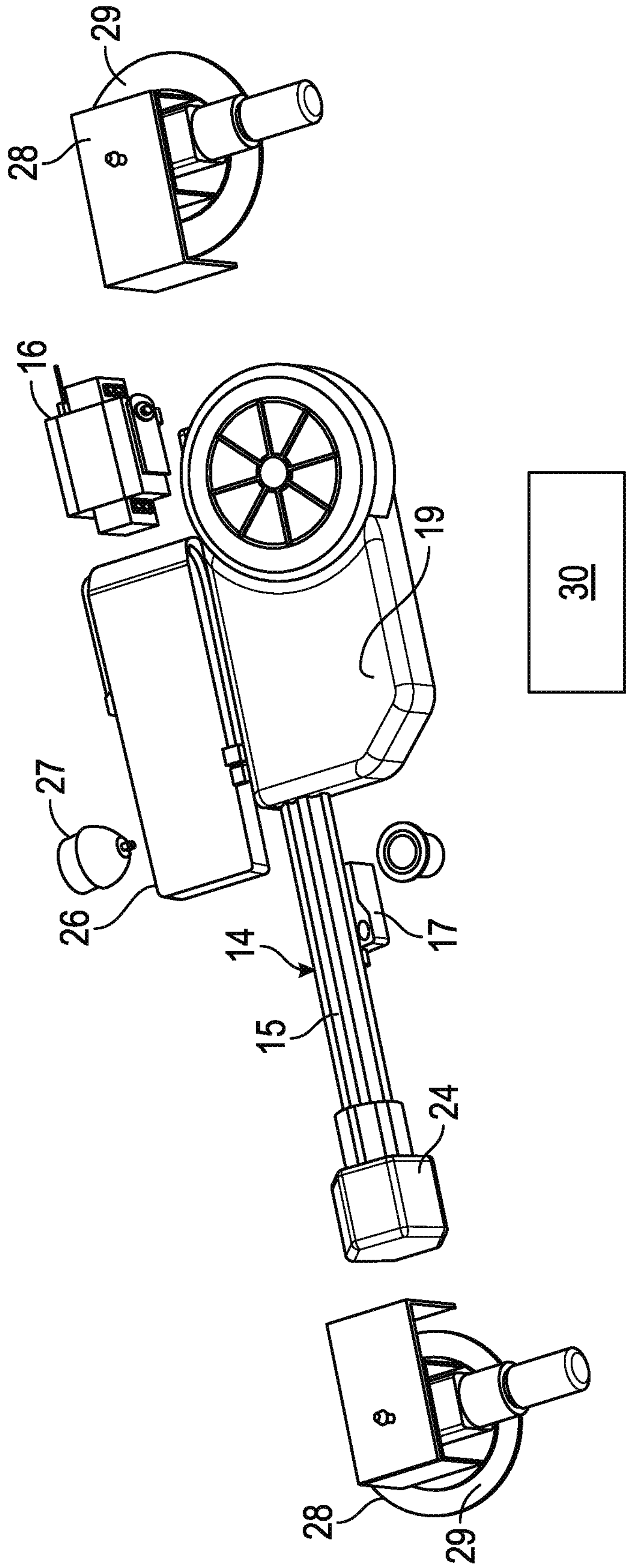
FIG. 5 shows an exemplary view of some of the components contained in the base housing unit of the smart vehicle locator system according to an embodiment of the present disclosure.
Figure 6:
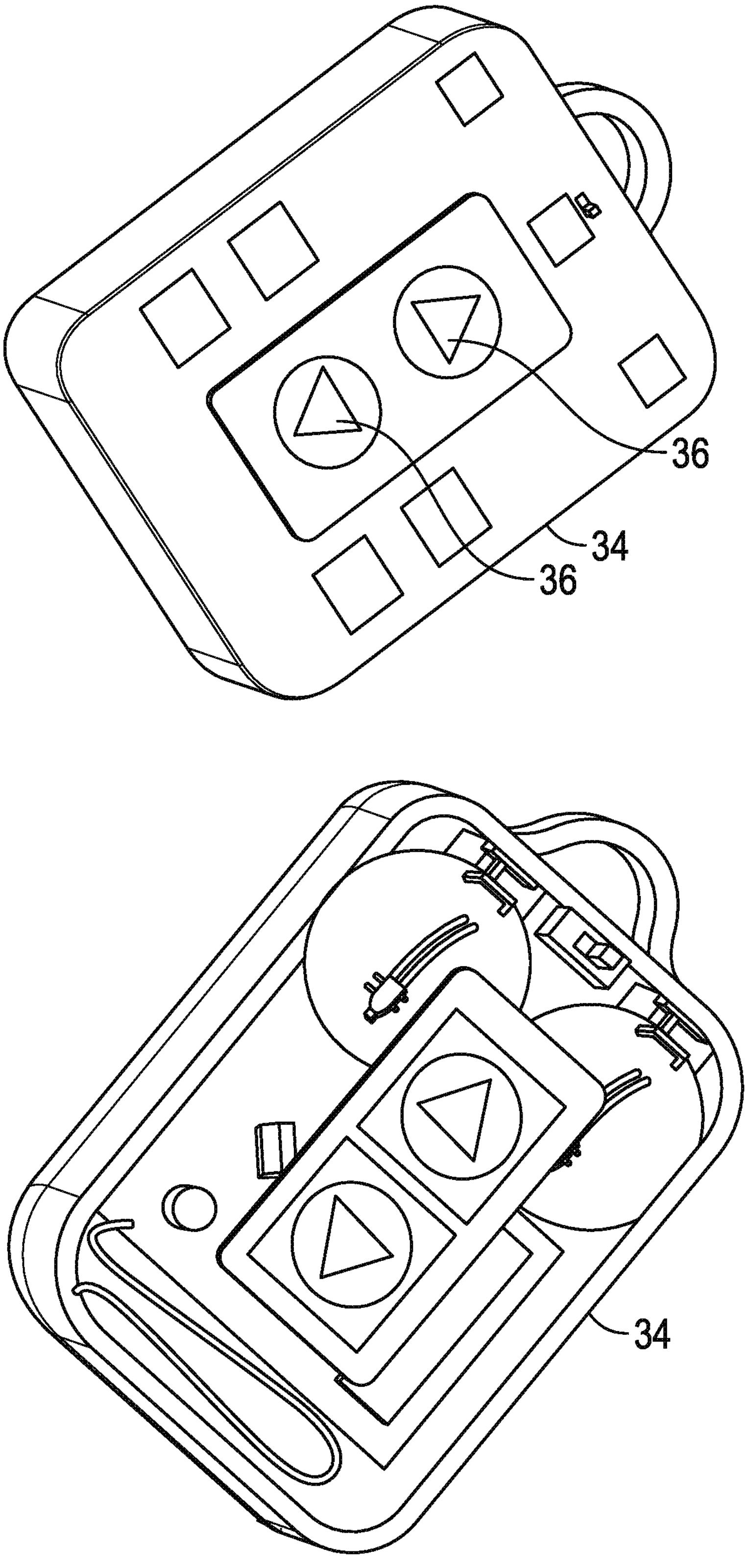
FIG. 6 shows an exemplary view of the remote control device of the smart vehicle locator system according to an embodiment of the present disclosure.
Figure 7:
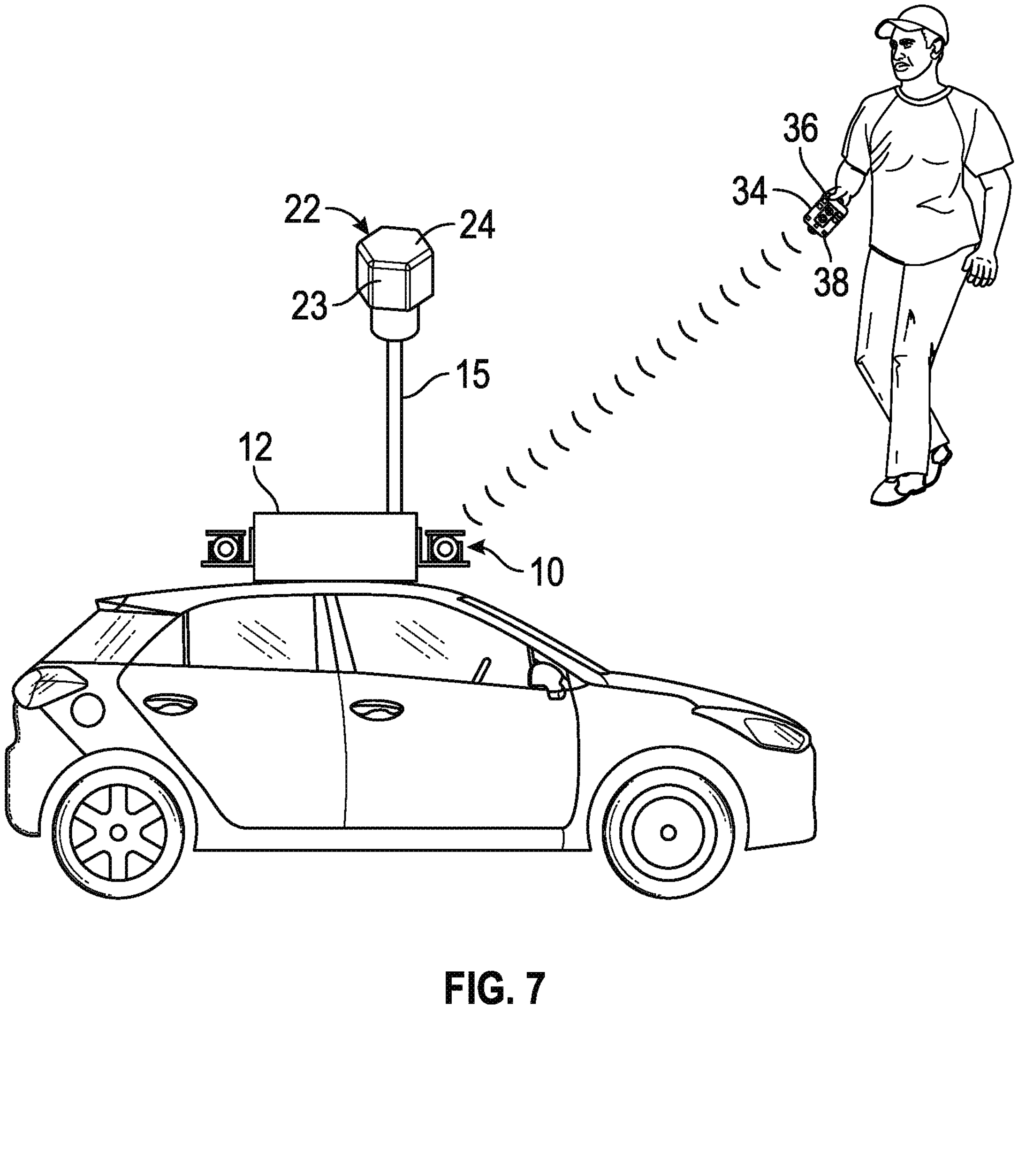
FIG. 7 shows an exemplary view of the smart locator system in an operating environment according to an embodiment of present disclosure.

When the antenna 15 is activated, the antenna will rise (i.e., erect) in a vertical manner relative to the base housing unit to its highest height unless there is an object detected along its vertical range of motion (i.e., its path of erection). Turning to FIG. 5, the antenna device 14 includes a proximity sensor 17 and a sensor 17 for detecting an obstruction along the space of travel for the antenna when erected. The sensor 17 may be an ultrasonic range finder sensor. If either proximity sensor 17 or sensor 18 detect an obstruction, a signal is sent to the controller 30 as a notification of an obstruction. If the antenna has began rising, upon the detection of an obstruction, the antenna will be deactivated and return to its collapsed default state. If the antenna has not begun rising, upon the detection of an obstruction, the antenna will be deactivated to prevent it from rising.

The antenna 15 and the antenna housing unit 19 lie horizontally atop a surface of the base housing unit in a default state. The antenna 15 in its default state extends outside of the antenna housing unit 19 but remains inside the base housing unit 12. The distal end of the antenna is fixedly attached to an inside region of the antenna housing unit 19. At its proximate end, the antenna 15 includes a light receiving surface 20 which attaches to illumination device 22.

Figure 4:
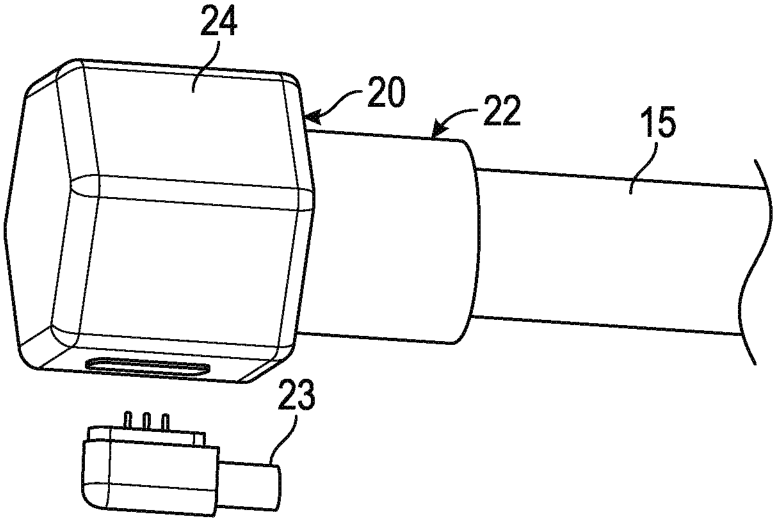
FIG. 4 shows an exemplary sectional view of a proximate end of the antenna device of the smart vehicle locator system according to an embodiment of the present disclosure.

The illumination device 22 includes a light housing shell 24 which is integrated with at least one light 23 (FIG. 4). The light housing shell includes a mechanical bearing to allow the housing shell to rotate (i.e., upon receipt of a light motion trigger) about the vertical axis of the antenna 15 (i.e., when the antenna is erected). The light housing shell 24 attaches to the light receiving surface 20 on the antenna device 14. The at least one light 23 may include a LED light (e.g., magnetic pogo connector light) which may be configured to switch between strobing (i.e., blink) and not strobing. The at least one LED light may include a green light, a yellow light and a red light. Upon receipt of a light strobe trigger, the at least one LED will strobe. Otherwise, upon activation of the at least one LED, the LED will not strobe.

The controller 30 includes a memory (i.e., a computer readable storage media) including a plurality of computer readable instructions and a processor for executing the plurality of computer readable instructions to control the operation of the antenna device 14 and to transmit and receive signals to and from the remote control device 34. The controller receives the commands sent from the remote control device and processes the commands accordingly. The controller receives signals from the antenna device 14 (i.e., proximity sensor 17 and sensor 18) regarding the clearance range of the antenna.

Upon receipt of an open antenna command from the remote control device 34, the controller 30 sends an activation signal to the antenna device 14 and an acknowledgment signal to the remote control device 34. If the controller receives an obstruction signal from the antenna device 14 (i.e., from either proximity sensor 17 or sensor 18), then the controller sends a deactivation signal to the antenna device 14 and sends a signal to the remote control device indicating that the antenna opening space is not cleared. If an obstruction signal is not received, then the controller sends an antenna actuator erected successfully signal to the remote control device 34.

Upon receipt of an antenna close command from the remote control device 34, the controller 30 sends a deactivation signal to the antenna device 14 and an acknowledgment signal to the remote control device 34. Upon receipt of the deactivation signal from the controller, the antenna device will turn off thereby causing the antenna 15 to collapse into the base housing unit 12. Thereafter, the controller sends an antenna actuator closed successfully signal to the remote control device.

Upon receipt of a rotate command from the remote control device 34, the controller 30 sends a rotate activation signal to the antenna device 14 and sends an acknowledgment signal to the remote control device 34. The rotate activation signal causes the antenna device 14 to rotate the illumination device 22 attached to the top of the antenna 15.

Upon receipt of a strobe command from the remote control device 34, the controller 30 sends a strobe activation signal to the illumination device 22 and sends and an acknowledgment signal to the remote control device 34. The strobe activation light causes the at least one light to strobe. The at least one light will continue to strobe until a deactivation signal is received from the controller.

Upon receipt of a change antenna LED color command from the remote control device 34, the controller 30 sends a corresponding light color activation signal (e.g., activate red light, activate yellow light, activate green light) to the illumination device and sends and an acknowledgment signal to the remote control device 34. The light color activation signal causes the corresponding light color of the at least one light to illuminate. The at least one light continues to illuminate until a deactivation signal is received from the controller 30.

The power device 26 provides power to components (i.e., antenna device 14 and controller 30) of the vehicle attachment device 10. The power device may be implemented as a rechargeable battery. The power device includes a charging pin 27 (shown in FIGS. 2A and 3A) for recharging the power device.

The remote control device 34 sends/receives signals to/from the vehicle attachment device 10. The remote control device may be configured as a handheld device. The remote control device comprises a housing, a memory including computer readable instructions, a processor for executing the computer readable instructions, a power device, at least one control key 36 (e.g., RGB buttons, Rotate illumination device button, Strobe LED(s) button, up button (i.e., open antenna), down button (i.e., close antenna) and at least one status indicator 38 (e.g., different color LEDs). The remote control device may be configured to provide the exemplary functions and status indicators listed in Table 1-1.

TABLE 1-1

| Status Number | LEDs | Button | State | Representation |
|---|---|---|---|---|
| 1 | Left Orange LED | | Glow | Remote control device battery low (below threshold %) |
| 2 | Right Orange LED | | Glow | Vehicle attachment device battery low (below threshold %) |
| 3 | Right Orange LED | | Blink | No acknowledgment received from the vehicle attachment device against sent command |
| 4 | Upper White LED | | Glow | Antenna erected successfully |
| 5 | Lower White LED | | Glow | Antenna closed successfully |
| 6 | Upper White LED | | Blink | Antenna opening space is not cleared |
| 7 | | RGB Buttons, one button for the color red, one button for the color green and one button for the color yellow | | Change color of antenna LEDs to green, yellow or red<br>Change light from solid to strobing<br>If successful > LED will change to the pressed RGB button<br>If no acknowledgment signal is received > Right Orange LED will blink (Status Number 3) |
| 8 | | Rotate Light Button | | Rotate illumination device<br>Send rotate command (i.e., light motion trigger) to vehicle attachment device to rotate the top of the antenna (i.e., the illumination device) |
| 9 | | Strobe Light | | Strobe the LEDs<br>Send strobe command (i.e., light strobe trigger) to vehicle attachment device to strobe (i.e., blink) the LED(s) integrated in the illumination device |
| 10 | | Top/Up button | | Open antenna<br>Send antenna open command to vehicle attachment device<br>If successful > Upper White LED will glow (Status Number 4)<br>If space clearance issue > Upper White LED will blink (Status Number 6)<br>If no acknowledgment signal is received > Right Orange LED will blink (Status Number 3) |
| 11 | | Bottom/Down Button | | Close antenna<br>Send antenna close command to vehicle attachment device<br>If successful > Upper White LED will glow (Status Number 4)<br>If no acknowledgment signal is received > Right Orange LED will blink (Status Number 3) |

The disclosed embodiments are not inclusive and many other modifications and variations will be apparent to someone of ordinary skill in the art with construction skills in the related arts. Together the descriptions and accompanying illustrations seek to provide an explanation of the basic principles of the embodiment and its application. It is therefore intended that the specification and embodiments be considered as exemplary only.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A controller comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium (i.e., memory), containing instructions. Instructions embedded or encoded in a computer-readable medium may cause a programmable processor, or other processor, to perform various corresponding functionality when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the tem1 "computer-readable storage media" refers to physical storage media, and not signals, carrier waves, or other transient media.

What is claimed is:

1. A smart vehicle locator system comprising:

a base housing unit configured to removably mount to a vehicle;

a motor contained in the base housing unit, wherein the motor is configured to actuate motion of a motorized antenna;

an illumination device including a plurality of light units integrated on a structure attached to a proximate end of the motorized antenna;

an antenna cover contained in the base housing unit;

the motorized antenna is housed in the base housing unit in a default state and is controlled by a controller, wherein the motorized antenna is deployed and erected vertically from the base housing unit when activated by the controller and wherein the motorized antenna collapses into the base housing unit when deactivated by the controller and when in a default state;

a remote control device including at least one control key and at least one status indicator;

a controller for transmitting and receiving signals to and from the handheld remote control device, wherein the controller activates the motorized antenna so long as no objects are detected within the vertical range of motion of the motorized antenna if the motorized antenna is erected.

2. The system of claim 1, wherein the motorized antenna is collapsed into the base housing unit.

3. The system of claim 1 further comprising at least one sensor for detecting obstacles in the vertical range of motion of the motorized antenna.

4. The system of claim 3 wherein the sensor is at least one from the group comprising a proximity sensor and an ultrasonic range finder sensor.

5. The system of claim 1 wherein the distal end of the motorized antenna is fixed inside of the antenna cover.

6. The system of claim 1 wherein the illumination device rotates horizontally with respect to the motorized antenna when the motorized antenna is erected.

7. The system of claim 1 further comprising a sound emitter.

8. The system of claim 7 wherein the controller activates the sound emitter when at least one object is detected within the vertical range of motion of the motorized antenna.

9. The system of claim 1 wherein the controller sends a notification to the remote control device when at least one object is detected within the vertical range of motion of the motorized antenna.

10. The system of claim 1, wherein the at least one status indicator is an antenna obstructed indicator.

11. The system of claim 1 wherein the at least one control key is an erect antenna key.

12. The system of claim 1 wherein the at least one control key is a light strobe trigger.

13. The system of claim 1 wherein the at least one control key is a light motion trigger.

14. The system of claim 1 further comprising an attachment structure for attaching the base housing unit to a vehicle.

15. The system of claim 14 wherein the attachment structure comprises a plurality of suction cups.

* * * * *